United States Patent [19]

Goman

[11] Patent Number: 5,727,285

[45] Date of Patent: Mar. 17, 1998

[54] CASTER WHEEL BIASING MECHANISM

[75] Inventor: Gerald Eugene Goman, Horicon, Wis.

[73] Assignee: Deere & Company, Moline, Ill.

[21] Appl. No.: 645,365

[22] Filed: May 13, 1996

[51] Int. Cl.[6] .................................................. B60B 33/00
[52] U.S. Cl. ..................... 16/38; 16/43; 16/322; 16/332; 16/344; 16/35 R
[58] Field of Search ......................... 16/38, 35 R, 37, 16/39, 31 R, 43, 44, 280, 281, 331–335, 322, 342, 344

[56] References Cited

U.S. PATENT DOCUMENTS

| | | | |
|---|---|---|---|
| 2,960,717 | 11/1960 | Moore | 16/322 |
| 3,390,486 | 7/1968 | Walters | 16/331 |
| 3,699,609 | 10/1972 | Spatz | 16/44 |
| 3,851,354 | 12/1974 | Anderson | 16/331 |
| 3,988,800 | 11/1976 | Sachser | 16/43 |
| 4,788,741 | 12/1988 | Hilborn | 16/38 |
| 5,412,842 | 5/1995 | Riblett | 16/334 |

OTHER PUBLICATIONS

The Toro Company, brochure entitled "Toro –The Guardian Recylcler", 2 pages, dated 1993, published in the U.S.A.

*Primary Examiner*—Chuck Mah

[57] ABSTRACT

A caster wheel mounting mechanism having a shaft member to which the caster wheel is coupled, the shaft member having a generally circular cross section with a flatted portion, a mounting member having an opening within which the shaft member is pivotally received, and a compression spring for biasing an abutment member or ball into abutment with the shaft such that the caster wheel is biased to a predetermined position when the abutment member abuts the flatted portion of the shaft member.

20 Claims, 4 Drawing Sheets

CASTER WHEEL BIASING MECHANISM

1. FIELD OF THE INVENTION

The invention relates to caster wheels for mower decks and mechanisms that bias the caster wheel to particular locations.

2. BACKGROUND OF THE INVENTION

Conventional mowing vehicles are often provided with caster wheels which support a mower deck during operation. The caster wheels pivot with respect to the mower deck when the mowing vehicle executes a turn. Conventional caster wheel mechanisms typically include an upright shaft which is pivotally held within a cylindrical opening. As the mower vehicle makes a turn the shaft pivots within the opening to allow the caster wheel to pivot during the turn. Pivoting caster wheels generally prevent turf from being scuffed or otherwise damaged during a turn.

When the mower deck is raised, many conventional caster wheels are allowed to spin about the axis defined by the shaft. The spinning caster wheel can be noisy. When the deck is lowered to the ground again, the caster wheel may be turned to either side, and may contact the ground at an angle to the direction of travel. The turf can be scuffed or damaged when the caster wheel contacts the ground when misaligned with the direction of vehicle travel.

Therefore, it would be desirable for such a mechanism to bias the castor wheel to a predetermined position such that when the deck is lowered to the ground the caster wheel will contact the ground in proper alignment with the direction of forward vehicle travel. It would be desirable to provide a caster wheel mounting mechanism which allows the caster wheel to pivot throughout a large range of motion as the mowing vehicle executes turns and thereby prevent turf from being damaged during turns. It would also be desirable for such a mechanism to hinder the caster wheel from spinning when the mower deck and caster wheel are lifted off the ground.

SUMMARY OF THE INVENTION

The present invention provides a caster wheel having a shaft pivotally mounted in an opening defined in a mounting member. A ball member is biased by a spring to engage the surface of the shaft. The shaft is generally cylindrical with a flatted portion. Abuttment of the ball against the shaft, particularly against the flatted portion, will hinder the shaft and caster wheel from spinning. As the ball abutts against the flatted portion, the ball will apply a force to the shaft that will urge the shaft to pivot to its straight forward position. At that position the ball exerts a force on the flatted portion that is generally aligned with the axis of the shaft, and therefore the shaft will not be urged to pivot from this position.

An alternative embodiment provides a ball and spring carried in the shaft. The ball abuts against the inner surface of a generally cylindrical opening having a relief portion. The force of the ball against the inner wall of the opening, and particularly against the relief portion, will tend to hinder the shaft and caster wheel from spinning. The ball will tend to "bottom out" in the relief portion, which causes the shaft and caster wheel to remain or return to their straight forward positions.

The present invention thereby provides a caster wheel mechanism which allows the caster wheel to pivot throughout a large range of motion as the mowing vehicle executes turns and thereby prevent turf from being damaged during turns. The present invention also hinders the caster wheel from spinning when the mower deck and caster wheel are lifted off the ground. The present invention also biases the castor wheel to a predetermined, straight forward position such that when the deck is lowered to the ground the caster wheel will contact the ground in proper alignment with the direction of forward vehicle travel without scuffing the turf.

DETAILED DESCRIPTION OF THE PREFERRED EMBODIMENT

Figure 1:
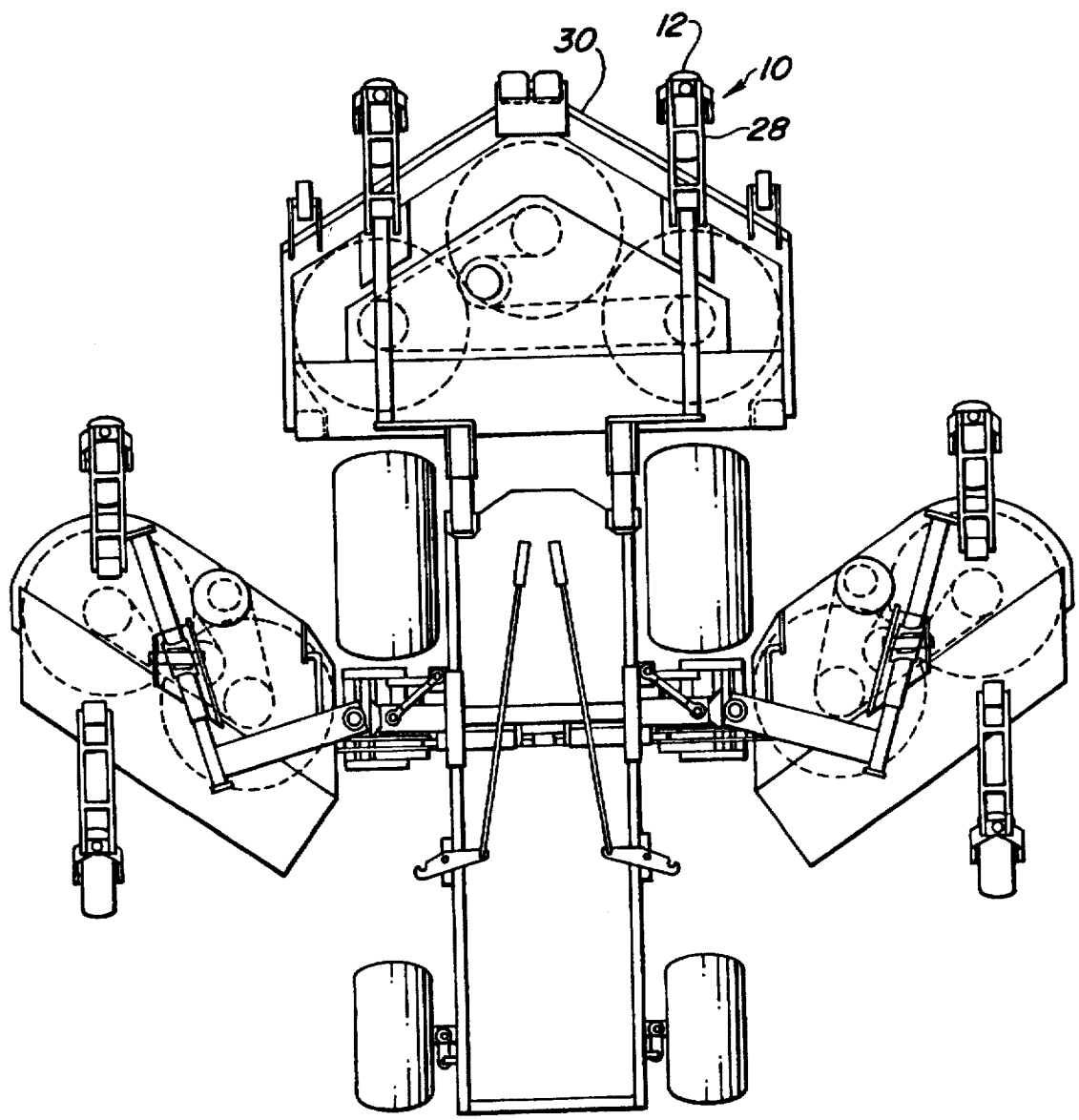
FIG. 1 is a plan view of a vehicle with which the present invention is adapted for use.
Figure 2:
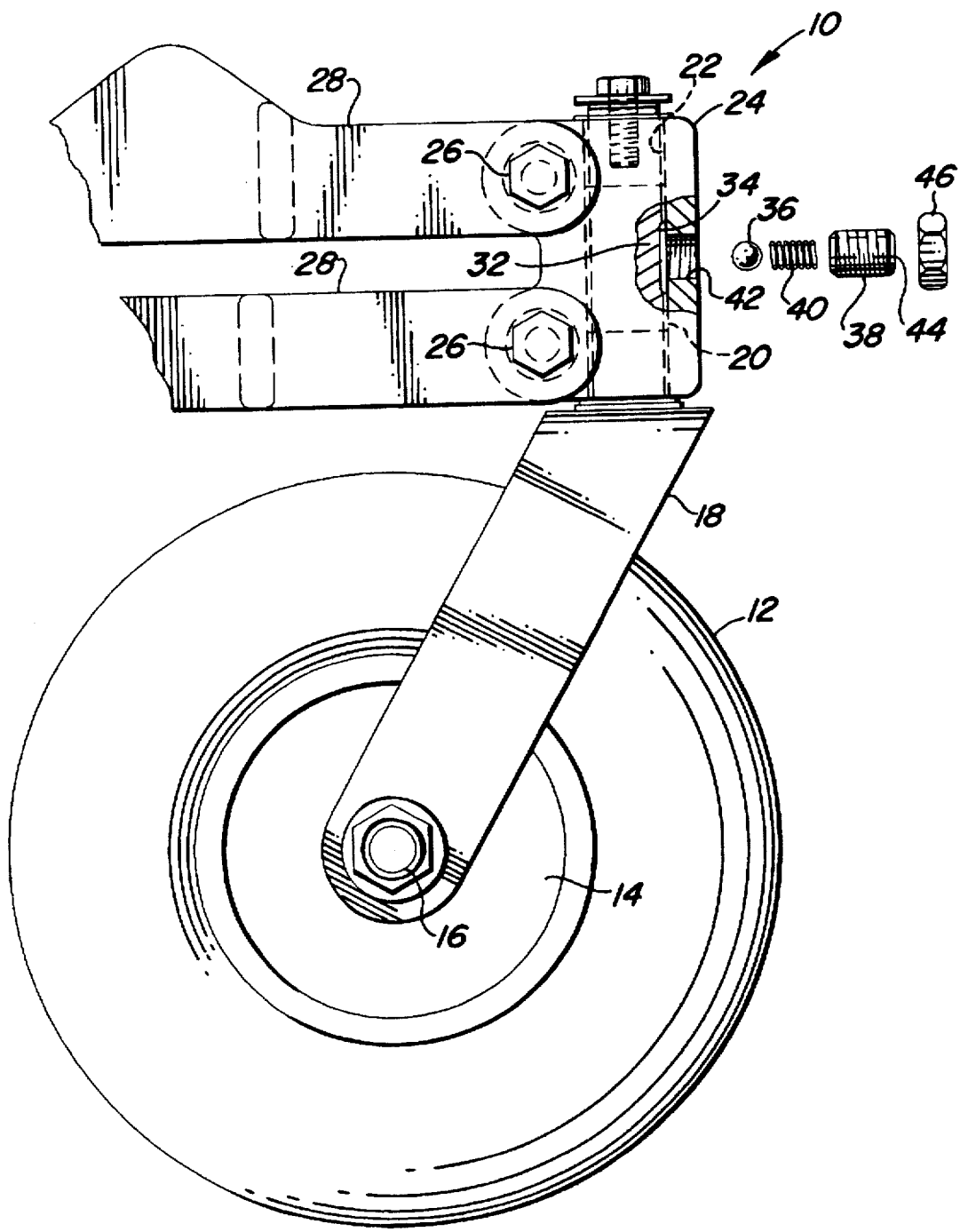
FIG. 2 is a side view of the caster wheel biasing mechanism according to the present invention.

Referring now to FIGS. 1–6, there is shown the present invention. FIG. 1 shows a caster wheel mounting mechanism 10 according to a first embodiment of the present invention. A tire 12 adapted for contacting the ground has a hub member 14 and axle 16 at its center. A fork member 18 is coupled with the axle 16 and extends upwardly therefrom. A pivot member or shaft member 20 extends upwardly from the fork member 18 and is received within a generally cylindrical opening 22 in a mounting member 24. The mounting member 24 is coupled via bolts 26 to beams 28 which form a four bar linkage between the mounting member 24 and a mower deck 30.

The present invention includes a mechanism for generally preventing the caster wheel 12 from spinning when lifted from the ground, and which generally biases the caster wheel 12 to its forwardly oriented position. The shaft 20 is generally cylindrical in shape, with a generally circular cross sectional portion 32, but includes a flatted portion 34 as seen in FIGS. 2–5. An abutment member or ball 36 is held within a threaded member 38, and is biased by a biaser or compression spring 40 into abutment with the shaft 20. The threaded member 38 is received within a threaded opening 42 in the mounting member 24. The threaded member 38 includes a central opening 44 within which the ball 36 and spring 40 are positioned. A nut member 46 generally encloses the central opening 44 and generally confines the ball 36 and spring 40 within the central opening 44.

Figure 3:
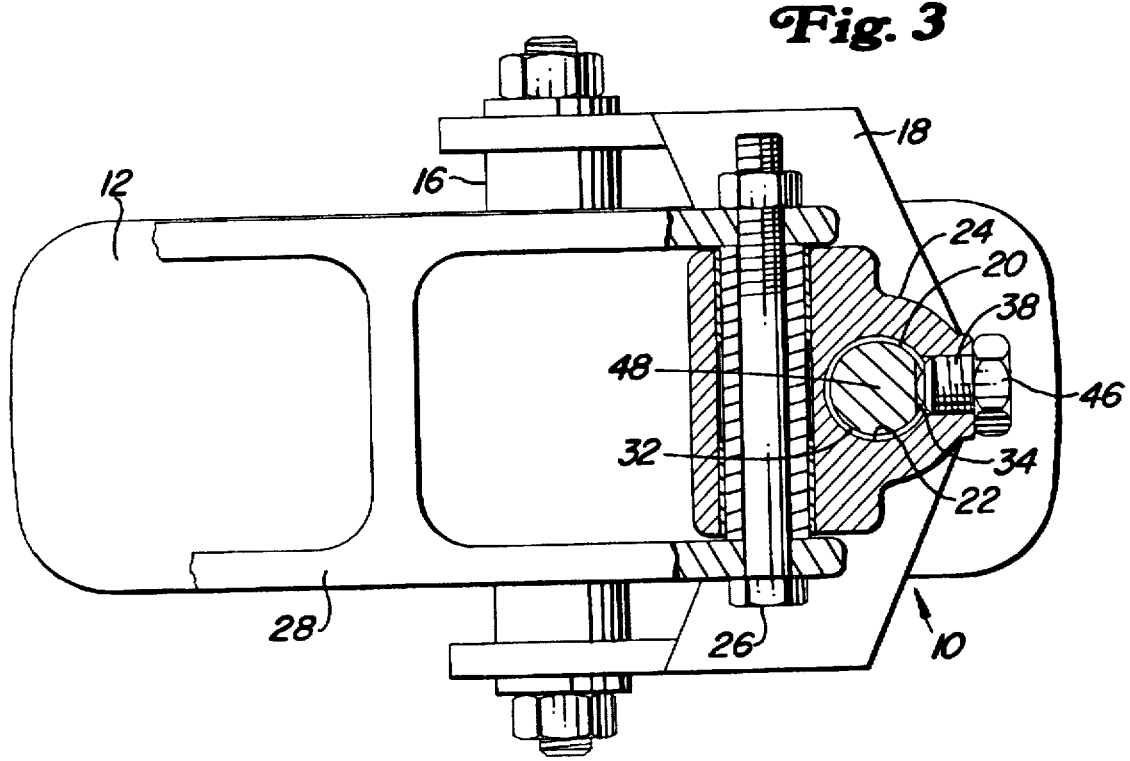
FIG. 3 is a top sectional view of the caster wheel biasing mechanism according to the present invention showing the wheel in its straight forward alignment.
Figure 4:
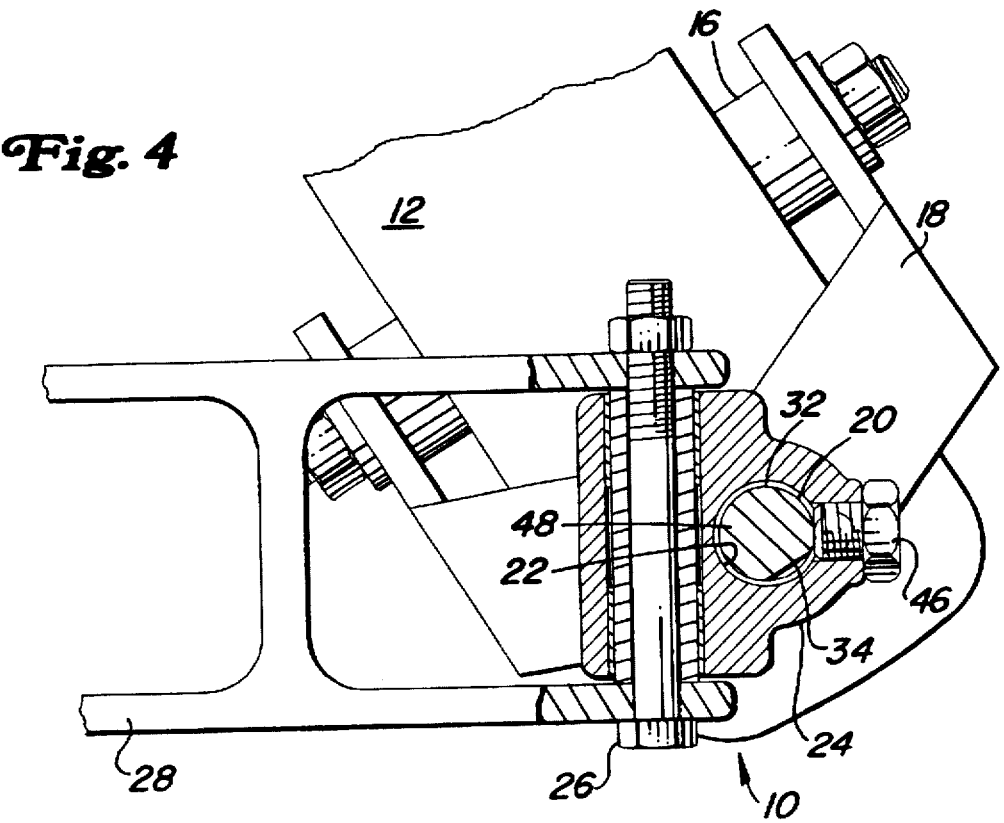
FIG. 4 is a top sectional view of the present biasing mechanism showing the wheel turned.

Next, the operation of the embodiment shown in FIGS. 1–5 will be discussed in greater detail. During normal mowing operations the caster wheel tire 12 rolls in engagement with the ground surface. As the mowing vehicle executes a turn, the caster wheel 12 is allowed to pivot so that the tire 12 continues to roll across the ground and not mar or scuff the surface of the turf. When the caster wheel 12 pivots, the shaft 20 will pivot within the opening 22 in the mounting member 24. As the shaft 20 pivots from its forward position shown in FIGS. 2 and 3, the flatted portion 34 will press the ball 36 against the spring 40 and toward the nut member 46. The shaft 20 will continue to pivot until the ball 36 is in contact with the rounded cylindrical portion 32 of the shaft 20, as shown in FIG. 4. The shaft 20 is free to continue pivoting or pivot back to its straight forward position as shown in FIG. 3. The present invention thereby allows the caster wheel 12 to pivot through a wide range of motion during execution of a turn when the tire 12 is in contact with the ground.

Figure 5:
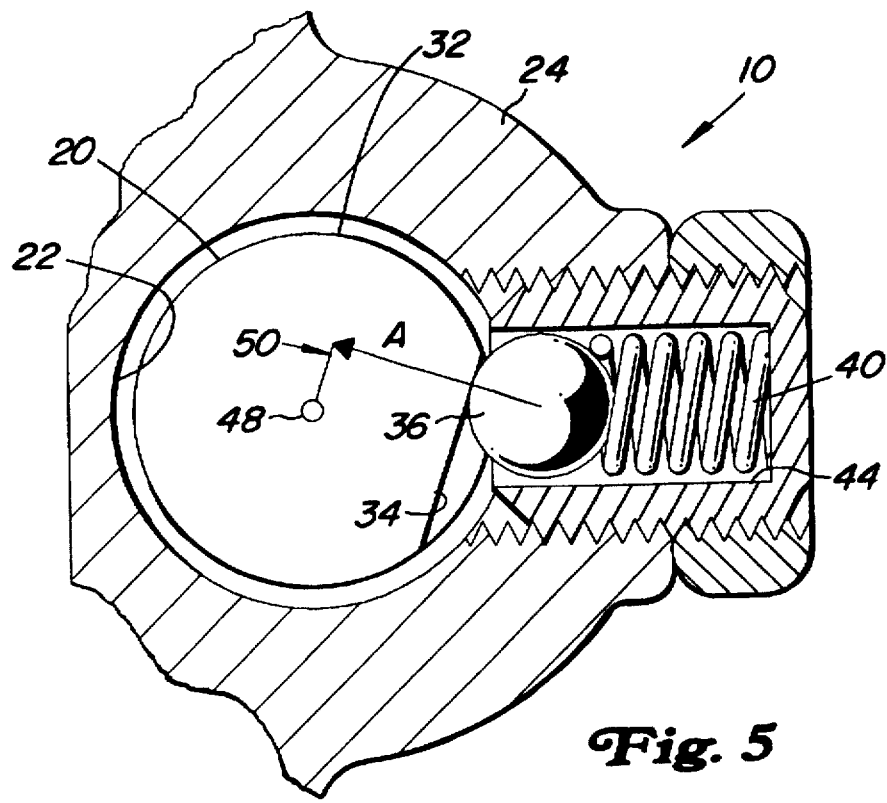
FIG. 5 is a sectional view of the present biasing mechanism when the wheel is turned slightly from its straight forward alignment.

The present invention also serves to restrain the caster wheel 12 from spinning and biases the caster wheel 12 to its straight forward configuration shown in FIG. 3. When the mower deck 30 is lifted and the tire 12 is out of contact with the ground, the tire 12 may encounter forces which urge the caster wheel 12 and shaft 20 to spin. If the forces encountered are great enough to cause the shaft 20 to spin, the abutment of the ball 36 against the shaft 20 serves to apply a force to the shaft 20 which resists spinning motion. The present invention also biases the caster wheel 12 to its straight forward position shown in FIG. 3. If the shaft 20 is pivoted slightly from the position shown in FIG. 3 to the position shown in FIG. 5, the flatted portion 34 will press outwardly on the ball 36 such that the spring 40 becomes slightly compressed. The spring 40 will continue to urge the ball 36 against the surface of the shaft 20. The ball 36 will apply a force normal to the surface of the flatted portion 34 along line A as shown in FIG. 5. The force A is offset from the central axis 48 of the shaft 20, and therefore this force A establishes a moment arm 50 which tends to pivot the shaft 20 back to its position shown in FIG. 3. When the shaft 20 returns to the position shown in FIG. 3, the force A applied to the shaft 20 by the ball 36 and spring 40 is aligned with, or in other words, intersects with or passes through the central axis 48 of the shaft 20, and therefore the shaft 20 will not be caused to pivot from this position by the force applied by the spring 40 and ball 36.

Figure 6:
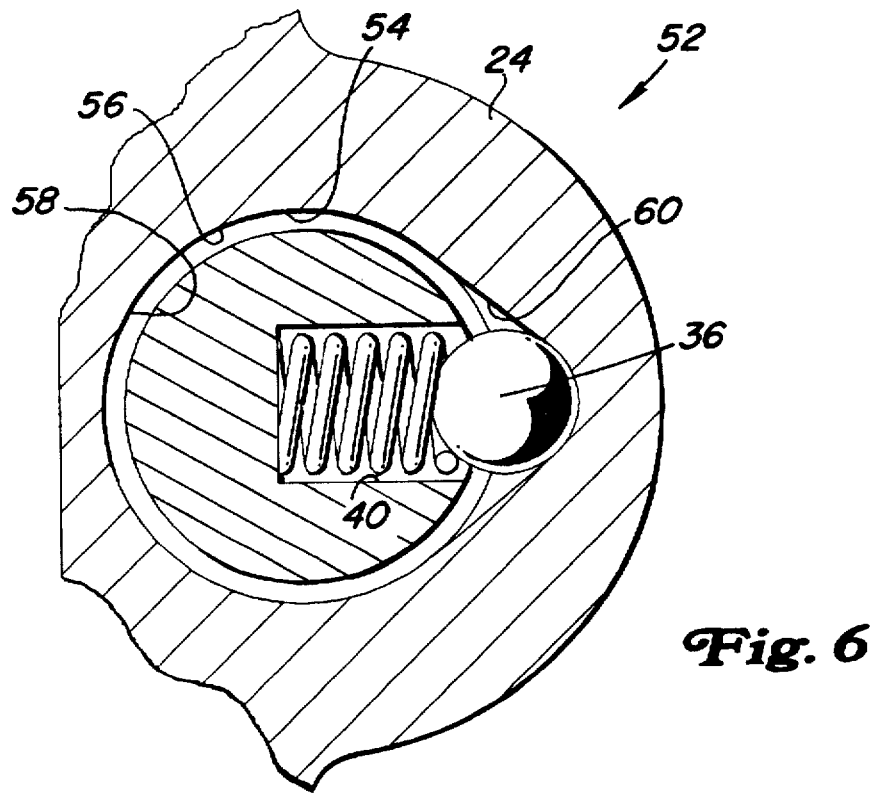
FIG. 6 is an alternative embodiment of the present invention.

Referring now to FIG. 6, there is shown an alternative embodiment 52 of the present invention. An abutment member or ball member 36 and spring 40 are supported by the shaft 20. The spring 40 biases the ball 36 outwardly into abutment with the inner diameter 54 of the opening 56 in the mounting member 24. The opening 56 has a generally cylindrical portion 58, and includes a curved relief portion 60. When the mower executes a turn, the caster wheel 12 will pivot, causing the shaft 20 to pivot within the opening 56. Pivoting of the shaft 20 causes the ball 36 to be compress against the spring 40 as the ball 36 leaves the relief portion 60 and begins rolling across the cylindrical portion 58 of the opening 56. Spinning of the caster wheel 12 and shaft 20 is generally hindered by the friction between the ball 36 and the opening 56. Furthermore, as the shaft 20 and caster wheel 12 spin, the ball 36 must pass through the relief portion 60 which requires the spring 40 to extend and then be compressed. Compression of the spring 40 absorbs energy from the spinning caster wheel 12, thereby helping bring the caster wheel 12 to rest.

The embodiment shown in FIG. 6 also serves to bias the caster wheel 12 to its straight forward position. As the caster wheel 12 pivots slightly from the position shown in FIG. 6, the ball 36 is compressed against the spring 40 as it abuts the surface of the relief portion 60. The spring 40 will continue to press the ball 36 outwardly. As the ball 36 is pressed outwardly, the surface of the relief portion 60 applies a force to the ball 36 along a line that is offset from the axis 48 of the shaft 20. A moment arm is thereby established which urges the caster wheel 12 to pivot back to its straight forward position shown in FIG. 6. With the ball 36 bottomed out in the relief portion 60 as shown in FIG. 6, the surface of the relief portion 60 applies a force to the ball 36 that is generally aligned with the axis 48 of the shaft 20, and therefore the shaft 20 is not urged to pivot from that position. Therefore the shaft 20 and caster wheel 12 are biased to return to and remain in a predetermined, straight forward position.

I claim:

1. A caster wheel mounting mechanism, comprising:

a pivotable caster wheel, a generally vertically extending pivot member coupled with the caster wheel, a mounting member which supports the pivot member for pivotal motion about an axis, a surface which includes a biasing surface portion defined therein, an abutment member biased into operative abutment with the surface and biasing surface portion defined therein, said abutment member and surface being pivotable with respect to each other as the caster wheel pivots, one of said surface and abutment member being operatively fixed for pivotal motion with the pivot member and the other being operatively fixed with the mounting member, and said abutment member operatively applies a force to the biasing surface portion for urging said pivot member and caster wheel to pivot to a single predetermined alignment, said force establishing a moment arm which urges the pivot member and caster wheel to the predetermined alignment when the abutment member is in abutment with the biasing surface portion and the caster wheel is not in the predetermined alignment.

2. The invention of claim 1, wherein:

said surface is operatively fixed for pivotal motion with the pivot member, and the abutment member is operatively fixed with the mounting member.

3. The invention of claim 2, wherein said pivot member is a shaft member pivotally received within an opening defined in the mounting member.

4. The invention of claim 3, wherein said surface includes a generally cylindrical outer diameter portion of the shaft, and the biasing surface portion is a flatted portion defined by the shaft.

5. The invention of claim 4, wherein the abutment member is a ball member, and a compression spring biases the ball member against both the cylindrical and flatted portions of the shaft as the shaft pivots within the opening in the mounting member.

6. The invention of claim 1, wherein:

said surface is defined by a portion of an opening defined in the mounting member for pivotally receiving the pivot member, and the abutment member is operatively supported by the pivot member.

7. The invention of claim 6, wherein said surface includes a generally cylindrical portion of the opening in the mounting member, and the biasing surface portion is a relief portion of the opening.

8. The invention of claim 7, wherein the abutment member is a ball member, and the biaser is a compression spring which biases the ball member against both the cylindrical and relief portions of the opening in the mounting member as the shaft member pivots.

9. The invention of claim 8, wherein said predetermined alignment corresponds with straight forward alignment of the caster wheel.

10. The invention of claim 6, wherein said predetermined alignment corresponds with straight forward alignment of the caster wheel.

11. The invention of claim 1, wherein said predetermined alignment corresponds with straight forward alignment of the caster wheel.

12. The invention of claim 1, wherein said abutment member operatively applies a force to the biasing surface portion for urging said pivot member and caster wheel to pivot to a predetermined alignment when the force does not intersect with said axis, and the pivot member and caster wheel are biased by said force to the predetermined alignment whereat said force intersects with said axis when the abutment member is in abutment with the biasing surface portion.

13. The invention of claim 12 wherein:
said surface is operatively fixed for pivotal motion with the pivot member, and the abutment member is operatively fixed with the mounting member.

14. The invention of claim 13, wherein said pivot member is a shaft member pivotally received within an opening defined in the mounting member.

15. The invention of claim 14, wherein said surface includes a generally cylindrical outer diameter portion of the shaft, and the biasing surface portion is a flatted portion defined by the shaft.

16. The invention of claim 15, wherein
the abutment member is a ball member, and
a compression spring biases the ball member against both the cylindrical and flatted portions of the shaft as the shaft pivots within the opening in the mounting member.

17. The invention of claim 16, wherein said predetermined alignment corresponds with straight forward alignment of the caster wheel.

18. A caster wheel mounting mechanism, comprising:
a caster wheel,
a shaft member to which the caster wheel is coupled, said shaft member having a generally circular cross section with a flatted portion,
a mounting member having an opening within which the shaft member is supported for pivotal motion about an axis of said shaft,
an abutment member carried by the mounting member and adapted for abutting both the flatted and generally circular portions of the shaft member as the shaft member pivots, and
a biaser for biasing the abutment member into abutment with both the flatted and generally circular portions of the shaft member, such that the abutment member applies a force to the flatted portion when the abutment member abuts the flatted portion, and when said force does not interesect with said axis said shaft member and caster wheel are urged to pivot to a predetermined alignment, the shaft member and caster wheel being biased by said force to the predetermined alignment whereat said force intersects said axis when the abutment member abuts the flatted portion of the shaft member.

19. A caster wheel mounting mechanism, comprising:
a caster wheel,
a shaft member to which the caster wheel is coupled,
a mounting member having an opening within which the shaft member is pivotally supported for pivoting about an axis of said shaft member, said opening having a generally circular cross section portion and a relief portion,
an abutment member carried by the shaft member and adapted for abutting both the relief and generally circular portions of the mounting member opening as the shaft member pivots,
a biaser for biasing the abutment member into abutment with the generally circular and relief portions of the mounting member opening as the shaft member pivots, and when the force does not intersect with said axis said biaser causes the abutment member to apply a force to the relief portion of the opening for urging said shaft member and caster wheel to pivot to a predetermined alignment whereat said force intersects said axis and the abutment member abuts the relief portion of the mounting member opening.

20. The invention of claim 19, wherein said predetermined alignment corresponds with straight forward alignment of the caster wheel.

* * * * *